(12) United States Patent
Sturges et al.

(10) Patent No.: US 9,204,267 B2
(45) Date of Patent: Dec. 1, 2015

(54) METHOD AND SYSTEM FOR CONTROLLING MOBILE COMMUNICATION DEVICE INTERACTIONS

(71) Applicant: TRUVU MOBILE, LLC, Oklahoma City, OK (US)

(72) Inventors: Stephen Best Sturges, Edmond, OK (US); Scott Loren Sturges, Edmond, OK (US); Steven Curtis Schwartz, Oklahoma City, OK (US)

(73) Assignee: TRUVU MOBILE, LLC, Oklahoma City, OK (US)

( * ) Notice: Subject to any disclaimer, the term of this patent is extended or adjusted under 35 U.S.C. 154(b) by 31 days.

(21) Appl. No.: 13/734,637

(22) Filed: Jan. 4, 2013

(65) Prior Publication Data

US 2013/0172027 A1   Jul. 4, 2013

Related U.S. Application Data

(60) Provisional application No. 61/582,998, filed on Jan. 4, 2012.

(51) Int. Cl.
*H04W 4/00* (2009.01)
*H04W 4/12* (2009.01)

(52) U.S. Cl.
CPC ........................... *H04W 4/12* (2013.01)

(58) Field of Classification Search
CPC ......... H04W 4/02; H04W 4/12; H04W 48/12; H04W 48/16; H04M 1/00; H04M 1/72; H04M 3/533; H04M 1/60; H04M 1/271; H04B 1/38; H04L 12/58

USPC .......... 455/412.1, 412.2, 413, 569.1, 569.2, 455/563, 567, 550.1, 79, 420, 414.1, 414.2, 455/414.3, 414.4, 379, 428.03, 432
See application file for complete search history.

(56) References Cited

U.S. PATENT DOCUMENTS

| | | | |
|---|---|---|---|
| 6,631,368 B1 | 10/2003 | Adelman | |
| 6,690,940 B1 | 2/2004 | Brown | |
| 6,771,946 B1 | 8/2004 | Oyaski | |
| 6,845,251 B2 | 1/2005 | Everhart | |
| 7,050,834 B2 | 5/2006 | Harwood | |
| 7,123,874 B1 | 10/2006 | Brennan | |
| 7,177,670 B2 | 2/2007 | Yoon | |
| 7,640,101 B2 | 12/2009 | Pair | |
| 7,689,253 B2 | 3/2010 | Basir | |
| 7,856,203 B2 | 12/2010 | Lipovski | |
| 8,185,139 B1 * | 5/2012 | Mangal | 455/466 |
| 8,395,522 B2 * | 3/2013 | Kweon | 340/670 |
| 8,744,492 B2 * | 6/2014 | Kuo | 455/456.3 |
| 2002/0142803 A1 | 10/2002 | Yamamoto | |
| 2003/0064755 A1 | 4/2003 | Piwowarski | |
| 2003/0083113 A1 | 5/2003 | Chua | |

(Continued)

*Primary Examiner* — Amancio Gonzalez
(74) *Attorney, Agent, or Firm* — McAfee & Taft, A Professional Corporation

(57) ABSTRACT

A system and method for processing incoming communications to a mobile device for presenting a user with information related to an incoming message and permitting the user to respond in a pre-selected manner. An incoming message is received and if a mobile device is in motion, information relating to the incoming message is shown on a display. In response to an incoming message a user issues a selected command. Selected commands result further action relating to the message including a reading of the incoming message, the return of a pre-configured response to a sender or placement of a call to a message sender.

13 Claims, 11 Drawing Sheets

(56) References Cited

U.S. PATENT DOCUMENTS

| | | |
|---|---|---|
| 2003/0114202 A1 | 6/2003 | Suh |
| 2005/0075128 A1 | 4/2005 | Diedrich |
| 2005/0096099 A1 | 5/2005 | Barclay |
| 2005/0143134 A1 | 6/2005 | Harwood |
| 2005/0202853 A1 | 9/2005 | Schmitt |
| 2005/0255874 A1 | 11/2005 | Stewart-Baxter |
| 2005/0288860 A1 | 12/2005 | Pair |
| 2007/0010943 A1 | 1/2007 | Pair |
| 2007/0072616 A1 | 3/2007 | Irani |
| 2009/0215387 A1 | 8/2009 | Brennan |
| 2009/0325566 A1 | 12/2009 | Bell |
| 2010/0009719 A1 | 1/2010 | Oh |
| 2010/0216509 A1 | 8/2010 | Riemer |
| 2010/0234047 A1 | 9/2010 | Lipovski |
| 2010/0297929 A1 | 11/2010 | Harris |
| 2011/0130132 A1 | 6/2011 | Lipovski |
| 2011/0136480 A1 | 6/2011 | Osann |
| 2011/0136509 A1 | 6/2011 | Osann |
| 2012/0089331 A1* | 4/2012 | Schmidt et al. ............ 701/445 |
| 2012/0259633 A1* | 10/2012 | Aihara et al. ............ 704/235 |

\* cited by examiner

Hardware diagram with control module as hardware unit:

Hardware diagram without hardware control module:

METHOD AND SYSTEM FOR CONTROLLING MOBILE COMMUNICATION DEVICE INTERACTIONS

CROSS REFERENCE TO RELATED APPLICATION

This application claims the benefit of U.S. Provisional Application 61/582,998 filed on Jan. 4, 2012.

BACKGROUND OF INVENTION

The present invention relates to a method and system for controlling communications with mobile communication devices. More specifically, the invention relates to a system and method for permitting safe hands free communication options through a mobile communication device while driving.

The use of mobile communication devices as well as the functionality of these devices have increased significantly and continue to increase. Mobile communication devices provide wireless phone, text, e-mail, access to social media environments and other applications and Internet communications, with the capabilities of the devices expanding constantly. Increased use of mobile communication devices has also led to increased dangers with drivers utilizing their mobile communication devices while driving. Use of mobile communication devices may distract drivers and has been cited as leading to automobile accidents. In response, legislatures in various states have passed laws prohibiting texting, holding phones or other uses of mobile communication devices.

Despite laws passed and dangers associated with using devices while driving, drivers continue to desire to use and access mobile communication devices or stay connected while driving. There is a need for a safe and effective means through which drivers can obtain information regarding incoming communications and take desired action in response to such incoming communications.

DESCRIPTION OF THE INVENTION

Figure 1:
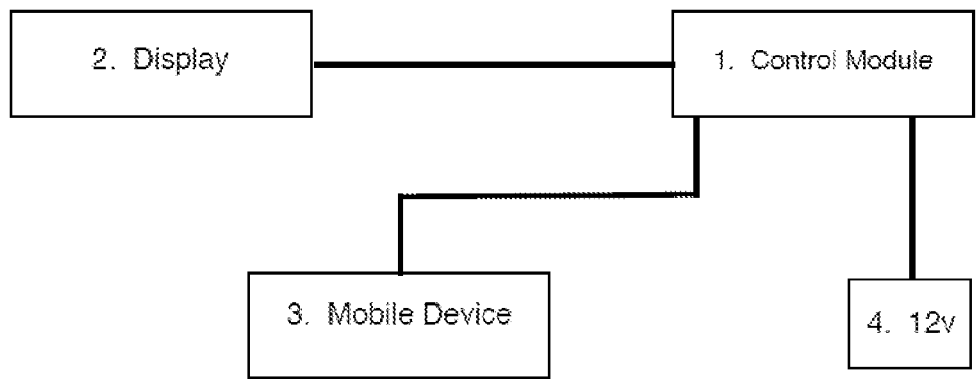
FIG. 1 depicts a hardware diagram in which the control module is a hardware unit connected to the system.

The present invention, allows for communication to and from a mobile communication device to be processed through a mobile application or control unit and permit hands-free communication through the mobile communication device. Portions of messages are displayed on a display, such as a Heads-Up-Display (HUD), smart screen affixed directly to the windshield or display attached to or incorporated in a mobile communications device permitting the user to interact with the message hands-free.

In one embodiment, the invention comprises a mobile communication device such as a smart-phone, a program or application installed on the mobile communication device and a display, such as a HUD, smart screen, screen affixed to a mobile device or screen integrated with the mobile device. Other displays may also be optionally used.

In another embodiment of the invention, the system of the present invention comprises a control module that interacts with a mobile communication device and a display. In one embodiment, the control module comprises components selected from the following: a microprocessor, flash memory, power supply, USB interface, smartphone interface, audio input and Bluetooth/or wi-fi capabilities. In another embodiment, the control module is a software application installed on a mobile device or is software integrated within the mobile device.

Display—

In one embodiment of the invention, the display comprises a heads-up display (HUD). In another embodiment, the display is in the form of an in-dash display, such as a radio LED or LCD display. In another embodiment, the display is in the form of a transparent smart screen affixed to the windshield. In another embodiment, the display is in the form of an independent screen that attaches to a mobile device. In yet another embodiment, the display is an integrated screen on the mobile device. Additional displays and methods of display may be readily apparent to one skilled in the art. The system displays information regarding the incoming communication and provides users with a variety of methods for response to the communication.

In one embodiment the display is a heads-up-display and is a dash mounted display unit that projects images onto the windshield creating a virtual display several feet in front of the driver and includes the following components:

1. HUD Projector—the component that actually produces the images.
2. Microphone—a directional and noise filtering microphone for hands free calling and voice commands.
3. Speaker—a high performance speaker for hands free calling and audio cues.
4. Optical sensor—detects ambient light and adjusts the output of the projector.

Control Module—

The control module takes several forms. In one form, the control module is a small unit that installs under the dash. In another configuration components of the module will be integrated into the HUD. In another embodiment, the mobile communication device with an installed application serves as the control module. In one embodiment, the control module comprises some or all of the following components:

1. Microprocessor
2. Flash memory
3. Power supply
4. USB interface
5. Smartphone interface
6. Audio output
7. Bluetooth
8. Wi-Fi In one embodiment, a mobile application is installed on a user's mobile communication device. The mobile application manages incoming or outgoing messages and data information and causes limited information regarding incoming messages to appear on a display to provide visual cues to the driver safely without taking their eyes off the road. The display presents limited information, such as mode of communication, sender's name and corresponding avatar and gives a driver the ability to safely respond to each message via voice commands. The system is designed to allow the driver to perform hands free and voice activated communication.

Upon receiving an incoming communication, the system determines whether an automobile is in motion. Detection of movement may be accomplished through global position systems (GPS) within the mobile phone in order to provide users with certain options. This may also be accomplished through other controls, such as controls interacting directly with the automobile or gyroscopic or other motion detection means within a mobile device.

In operation, the control module or mobile application interacts with the user's mobile communication device and displays portions of messages through the display. When a user is in motion, the mobile application (or control module) interacts with the mobile communication device to notify a user when an incoming message is received. The mobile application interacts with the display, causing information to be shown on the display regarding the incoming or outgoing message such as a name and phone number for an incoming phone call, name and subject matter for an incoming e-mail or name for an incoming text message or a reminder saved on a calendar signaling an imminent event such as an upcoming appointment or phone call.

A user may react to an incoming message by giving a voice command. A user may provide user commands such as the following: "read" "later" "save" "delete" or other commands that may be pre-configured in system or created by the user. For example, issuing a "later" command results in the message being marked for later review. The user may also issue a voice command of "read" or any other voice command programmed to cause the system to play an audio message or to cause any text message to be translated to an audio message and read through the system to the user. If there is no response from the user for a specified time period, the control module will remove the message on the display. The system can be configured to accept any variation of keywords or signals to be associated with pre-selected responses.

In one embodiment of the invention, an incoming message to a user's smartphone is received and processed in the control module in the form of a mobile application. The mobile application then sends a message to the display, which may take various forms, including a HUD, smart screen, screen affixed to the mobile device or integrated screen on the mobile device. The displayed message contains limited information, comprising the person's name and the mode of communication: i.e. Text from John Doe. The message is then projected on the display in a manner that does not interfere with the driver's line of sight. In the case of an incoming written message, once the driver sees the message, the driver has several response options, all done by simple voice command, comprising the following:

"Later" tells the phone to send the sender a standard message: "I'm driving right now, will contact you later"

"Save" tells the phone to save the message for reading at a later time

"Delete" tells the phone to delete the message without reading it

"Read" tells the phone to read the incoming message

If a user elects the "Read" option, the message, whether received as a voice message, text message or other data message is processed and audibly played for the user. The mobile application or system then permits the user to respond to the message through voice commands. For example, the driver may vocalize a response to the message. When completed with the message, the system will re-play the response for the user to approve. The system permits the user to approve the message or edit the message. The system then permits the user to send the message as response or store the message for later use. The system permits the user to conduct responses through voice commands.

The system can be configured to process a variety of incoming messages including: text messages, e-mail correspondence, phone calls, voice messages, appointment reminders from a calendar, RSS feeds, GPS Navigation and social media posts. Additional interactions and incoming data may be readily apparent to those skilled in the art.

In one embodiment, the system permits the user to activate texting through a voice command. The user then speaks the message to be delivered. The message to be delivered is translated to text. The system vocalizes the text translation for the user to approve. The system is configured to allow the user to edit the message, send the message or store the message for later.

The system connects to the user's mobile device through a variety of connective systems, including systems readily available on the market such as wireless connections, including Bluetooth connectivity or Wi-Fi or wired connections. Additional features and uses of the system include the following:

Operation of the system through various subscription services, including a subscription service to operate translation of incoming messages from text to audio;

Capability for preventing the full text message from being displayed on the windshield for a driver as long as the user's automobile is in motion, which detection may be achieved through implementation of global positioning system operations;

A Password protected mobile application that allows for preferences to be set up on a dedicated web site prohibiting a driver from seeing preferred data on the windshield unless the system is activated and in operation thereby limiting certain drivers, such as youth, from operating text on smartphones while in the automobile;

Capability for programming the system with pre-selected numbers and limit sending or receipt of any communications except to the pre-selected numbers;

Use of a user's accounts associated with the system to manage operations of the system and implement safeguards or prevent usage of smartphone or mobile devices operated within the system; and A device holder compatible with various makes and models of smartphones, HUDs or mobile devices.

In one embodiment, configuration settings for the mobile application are controlled through an administrator web portal. The administrator portal allows for adjusting settings on the mobile application, such as limiting or expanding the number of communication features available through the mobile application. In this way, an administrator may permit certain users to view information only related to incoming phone calls and not incoming text messages or vice versa. Functions of the system will be managed through the web portal. The account holder will set up his/her preferences on the web portal, pay for additional subscription services and be able to order additional hardware like a separate display such as the HUD or smart screen via the web portal.

DETAILED DESCRIPTION

FIG. 1 depicts a diagram in which a control module (1) connects to a display (2), a mobile device (3) and a power source (4). In one configuration, the control module (1) is physically connected to the display. In another embodiment, the control module wirelessly communicates with the display and mobile device (3).

Figure 2:
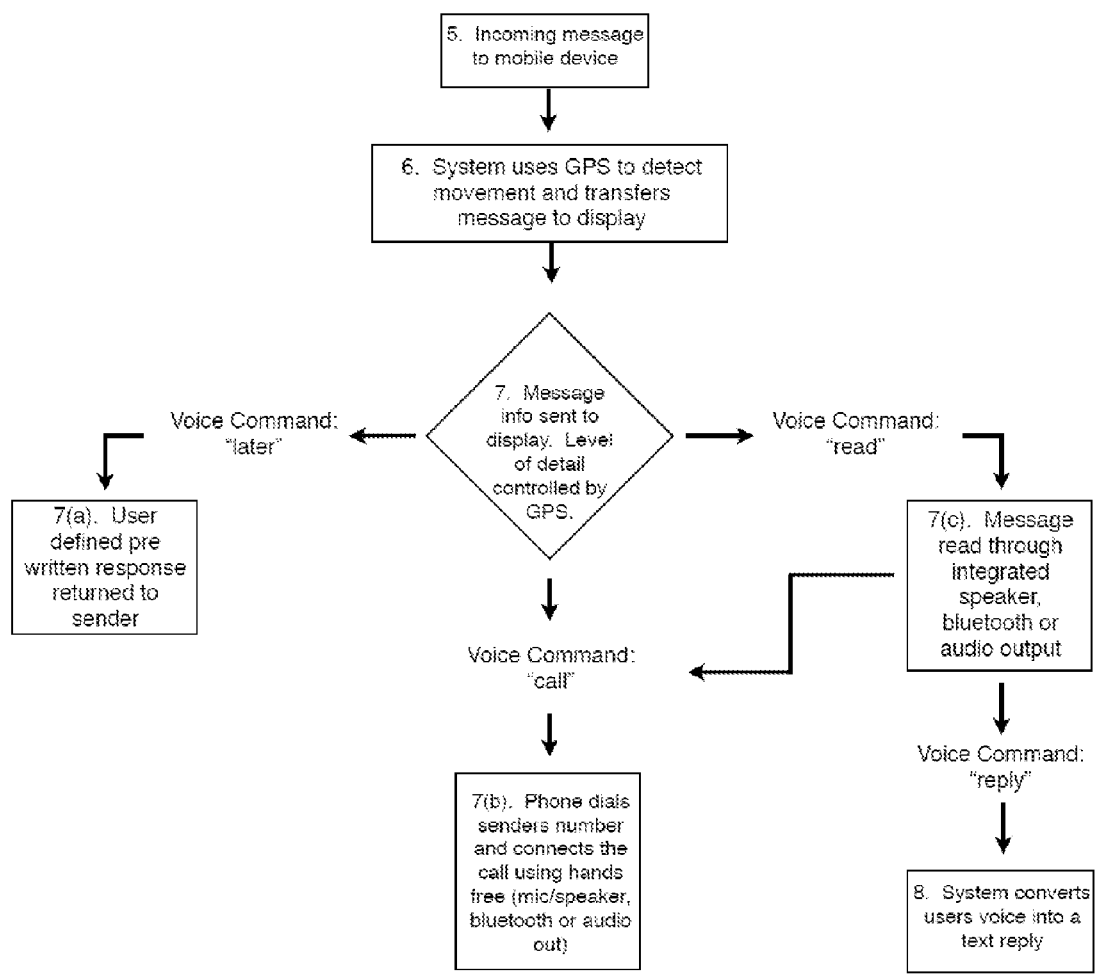
FIG. 2 depicts a process flow diagram of processing a message through the system

FIG. 2 depicts process flow of one embodiment of the invention in which an incoming message is received at a mobile device (5). The system detects whether movement associated with the mobile device exceeds a threshold level of movement (6). If a threshold movement is exceeded, incoming messages to the mobile device such as incoming text messages, voice mails or other messages, are processed through the control module. Information regarding the message is then transmitted to the display (7). A user then issues a command. Commands include the following: "later", "read", "reply" or "call." The system can be configured for customized commands as well. When a user issues a "later" command, a pre-written or pre-defined response is returned to message's sender (7a). When a user issues a "read" command, the message is played aloud (7c). For voice-mail messages, the recorded messages are played. For messages received in text form, the text is converted to a voice message and played. A number of systems and applications exist for converting text to sound and can be configured to operate with the system. After hearing the message, a user can issue a "call" command resulting in a responsive phone call to the message sender (7b) or can issue a "reply" or similar command. When a user issues a "reply" command, the user has the option to record a voice message, listen to the message and edit or accept the recorded message. The message can then be sent as a voice message or converted to a text message for reply (8).

Figure 3:
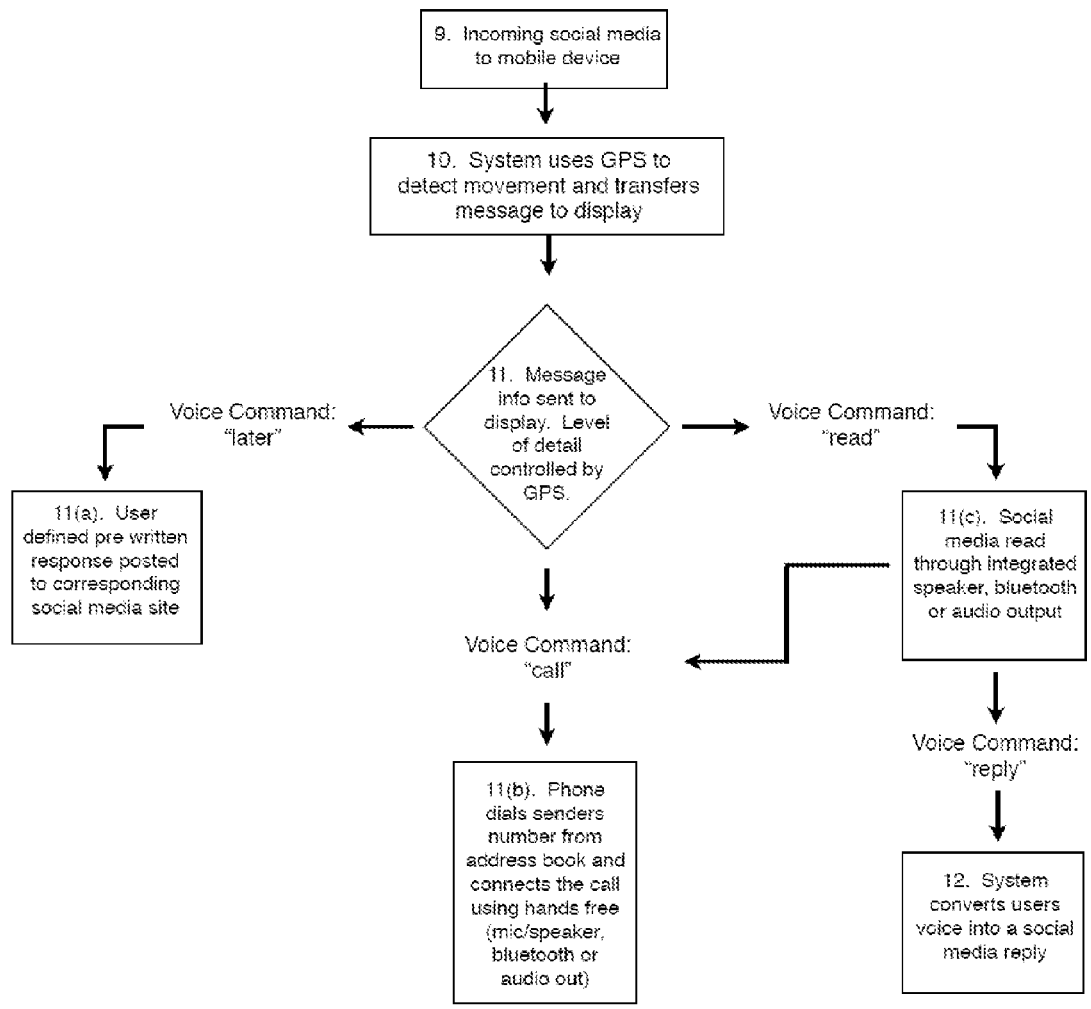
FIG. 3 depicts a process flow diagram of processing a social media message.

FIG. 3 depicts the process flow of an embodiment of the invention in which an incoming social media message is received at the mobile device (9). If movement of the mobile device is detected (10), the control module directs information regarding an incoming message to the display (11). The control module controls the level of information transferred to the display for review (12). A user presented with information on the display may select a response from a variety of options. A user can issue a "later" command, which will queue the message for later response or post a pre-selected message to the social media site. A user can issue a "call" command to direct a call to a number that corresponds to a social media user that posted the incoming message. A user can also use a "read" command to direct the system to audibly read the full post.

Figure 4:
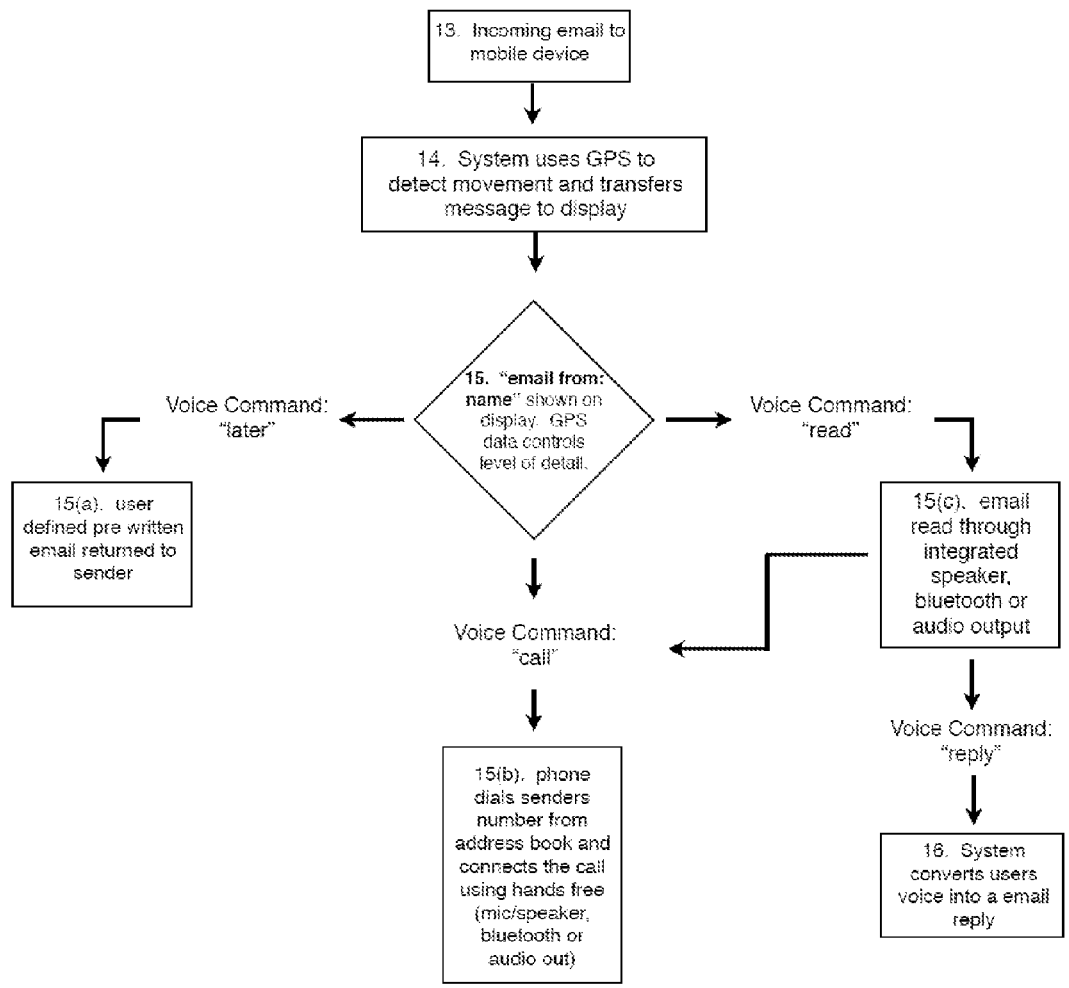
FIG. 4 depicts a process flow diagram of processing an incoming e-mail message.

FIG. 4 depicts the process flow of an embodiment of the invention in which an incoming e-mail message is received at a mobile device. If movement of the mobile device is detected, the control module transfers information regarding the incoming message to the display (15). The control module directs the level of detail regarding the incoming message to the display (16). In response to an incoming message a user can issue commands comprising: later, read and call. When a user issues a "later" command, a pre-defined reply is sent to the message sender (16a). When a user issues a "read" command, the message is read out loud via car speakers or other audio output (16b) When a user issues a "call" command, the system places a phone call to a number corresponding to the e-mail address for the incoming message (16c).

Figure 5:
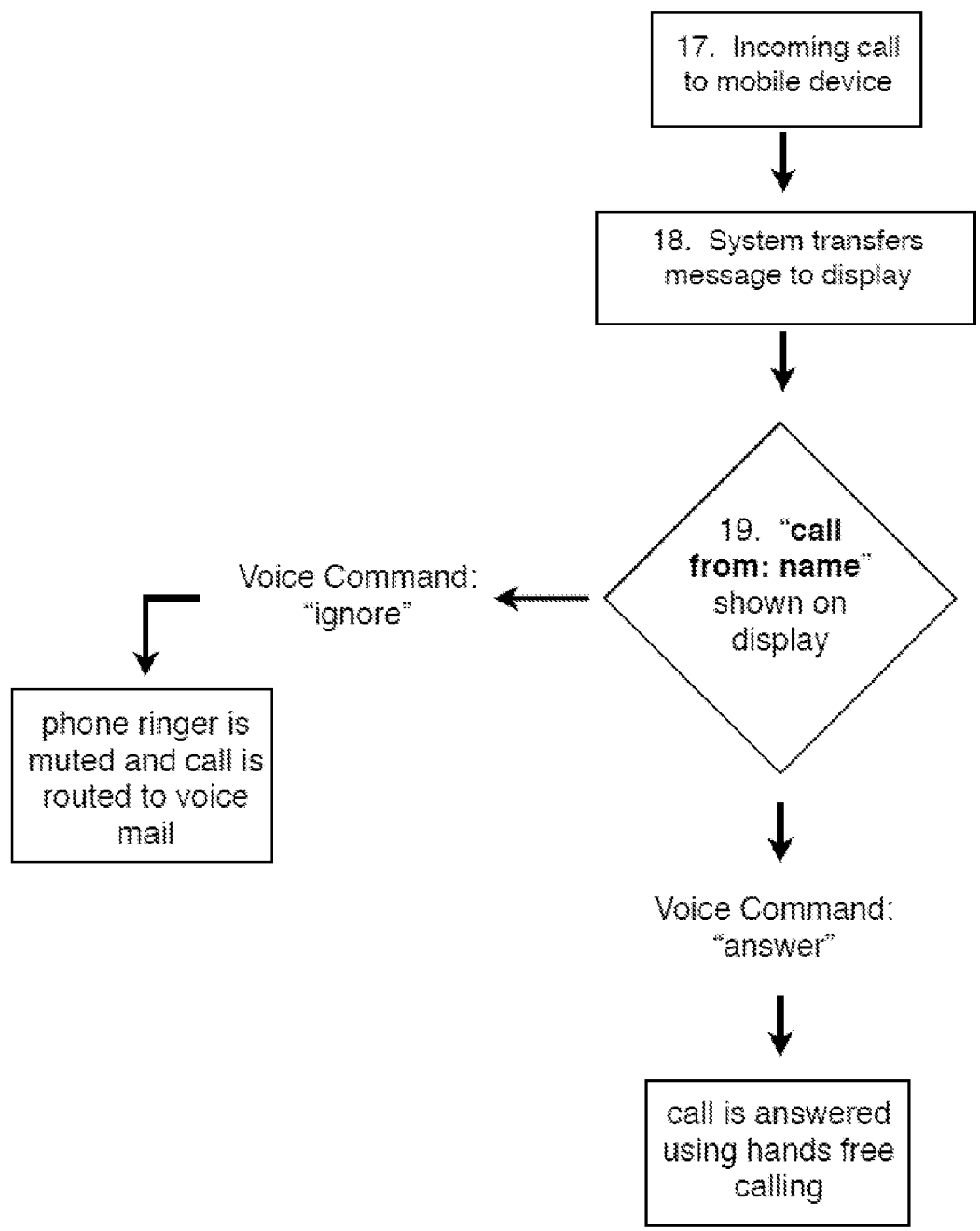
FIG. 5 depicts a process flow diagram of processing an incoming phone call.

FIG. 5 depicts the process flow for an incoming phone call to a mobile device (17). An incoming call is process and information regarding the incoming call is shown in the display such as caller identification in the form of "call from [Name of Caller] (18). In response to an incoming call, a user can issue an "ignore" command. When an ignore command is issued, the phone ringer is muted and the call is routed to voice mail (19). When an "answer" command is issued, the phone call is answered and broadcast through audio speakers, hands-free headset or other mechanism or system that permits hands-free handling of the incoming call (20).

Figure 6:
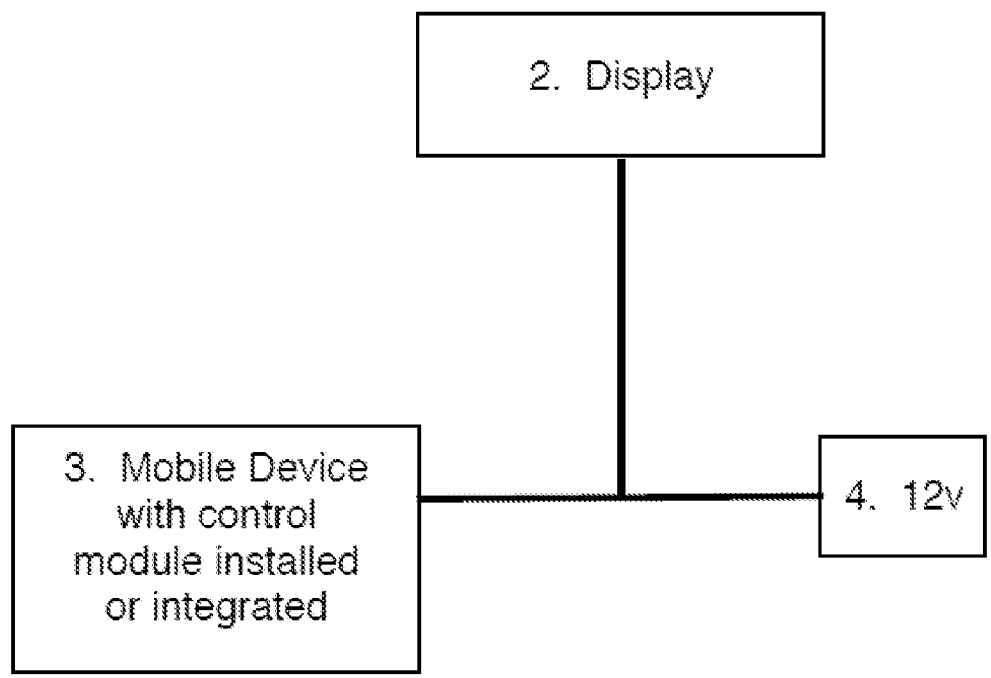
FIG. 6 depicts a schematic hardware diagram where the control module is operated as an application or other integrated installation on a mobile device.

FIG. 6 depicts a hardware schematic diagram wherein the control module (1) is installed as an application or integrated within the mobile device (3) and the mobile device (3), display (2) and power system (4) are connected.

Figure 7:
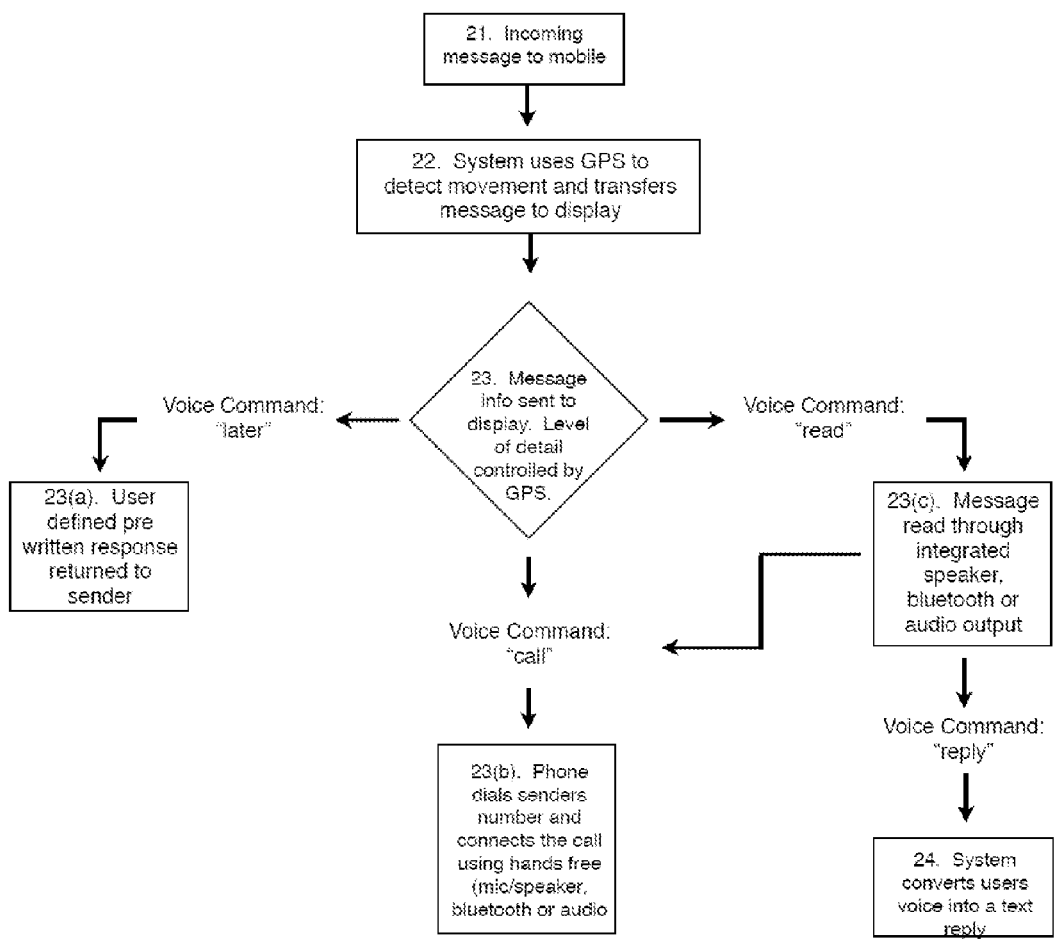
FIG. 7 depicts a process flow diagram of processing an incoming message on system with control module integrated with mobile device.

FIG. 7 depicts a process flow diagram in which an incoming message is received at a mobile device (21) and the system with an integrated control module detects movement of the mobile device and transfers information regarding the incoming message to the display (22). A user can then issue a "later" command or ignore the message in which case a pre-defined written response is transmitted to the message sender (23a). A user can issue a "read" command in which the message is read through a speaker or other audio output (23b). If a user issues a "call" command, a phone call is placed to a number corresponding to the information for the incoming message sender. In one embodiment, a "reply" command results in the dictation of a text message response to an incoming message (24).

Figure 8:
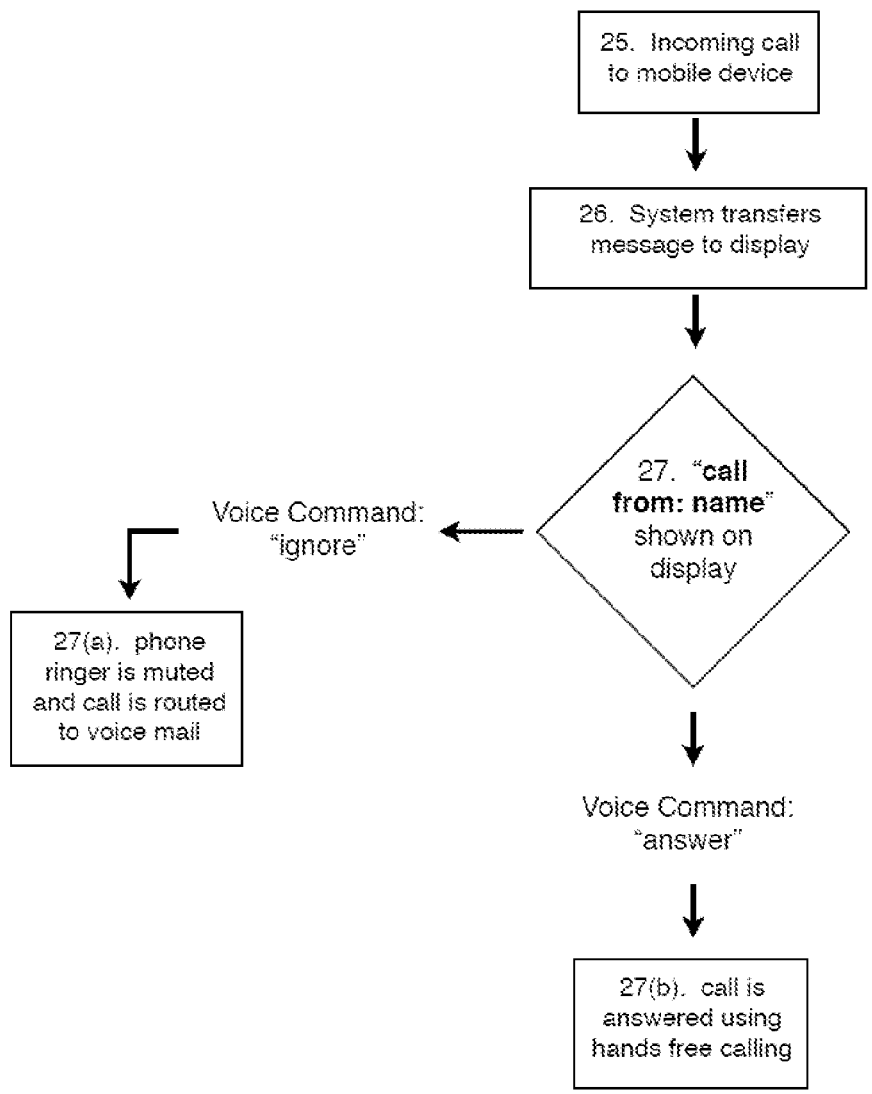
FIG. 8 depicts a process flow diagram of processing an incoming call.

FIG. 8 depicts a process flow diagram in which an incoming call is received at a mobile device. The system then transfers information regarding the incoming message to the display. FIG. 8 depicts a windshield display, but as noted above, the display may take a variety of forms (26). Information regarding the identity of the caller is shown on the display (27). A user can issue an ignore command resulting in a muting of the phone ringer and a transfer of the call to voice mail (27a) or a user can elect to answer the call via a hands free calling device or system (27b).

Figure 9:
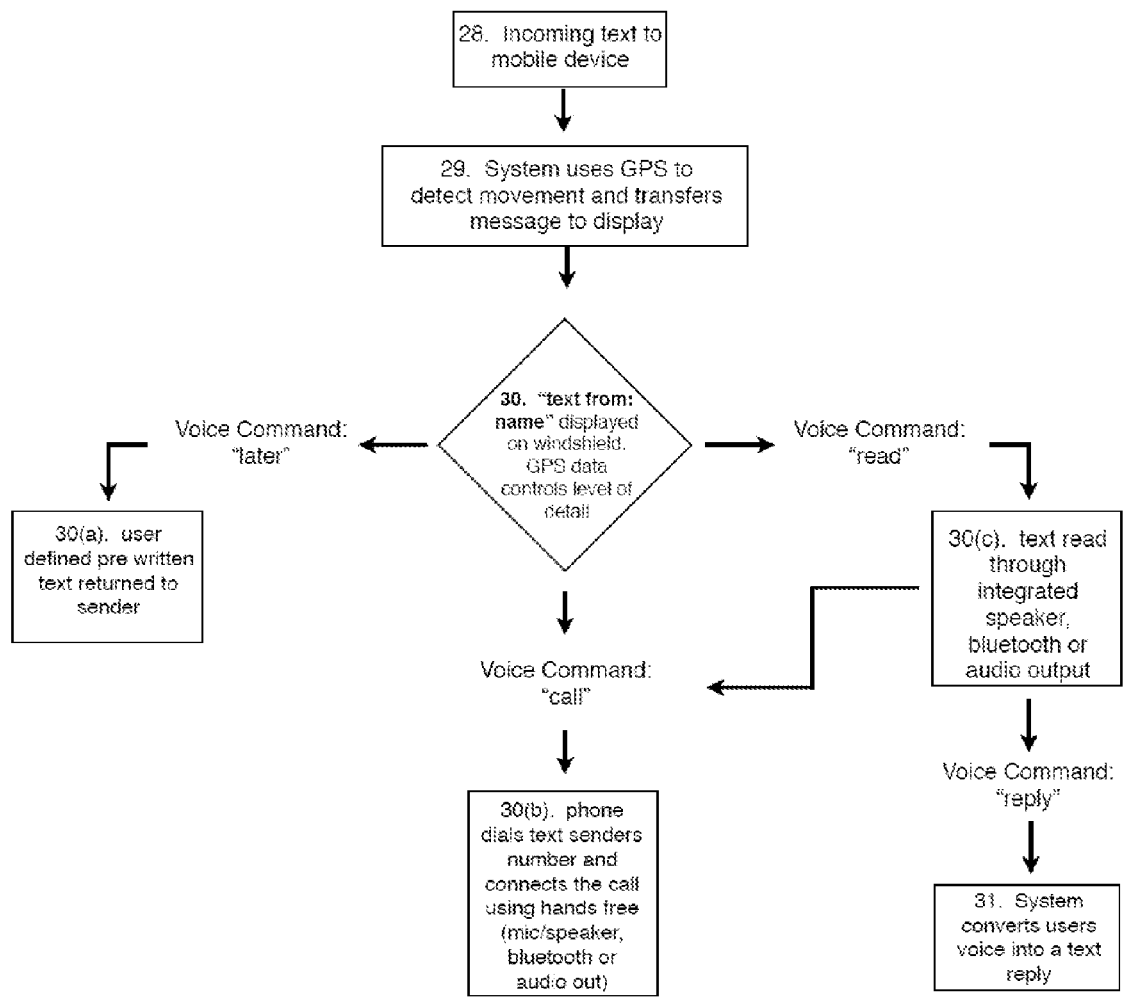
FIG. 9 depicts a process flow diagram of processing an incoming text.

FIG. 9 depicts a process flow diagram in which an incoming text is received at a mobile device (28). If movement of the mobile device is detected, information regarding the incoming text is transmitted to the display (29). Information regarding the name of the text sender and additional information from the text are presented on the display. The user can respond by voicing (or speaking) a "later" command, upon which a pre-defined text is returned to the sender indicating the status of the user (30a). The user can issue a call command to make a hands-free call to the sender of the incoming message (30c). A user can also issue a "read" command following which the incoming text is converted to audio for output on speakers or other audio device (30b). A user can also issue "reply" command and record a voice message. After recording a voice message, the user can modify, delete or approve the message and have the message sent to the sender of the incoming text in the form of a text message.

Figure 10:
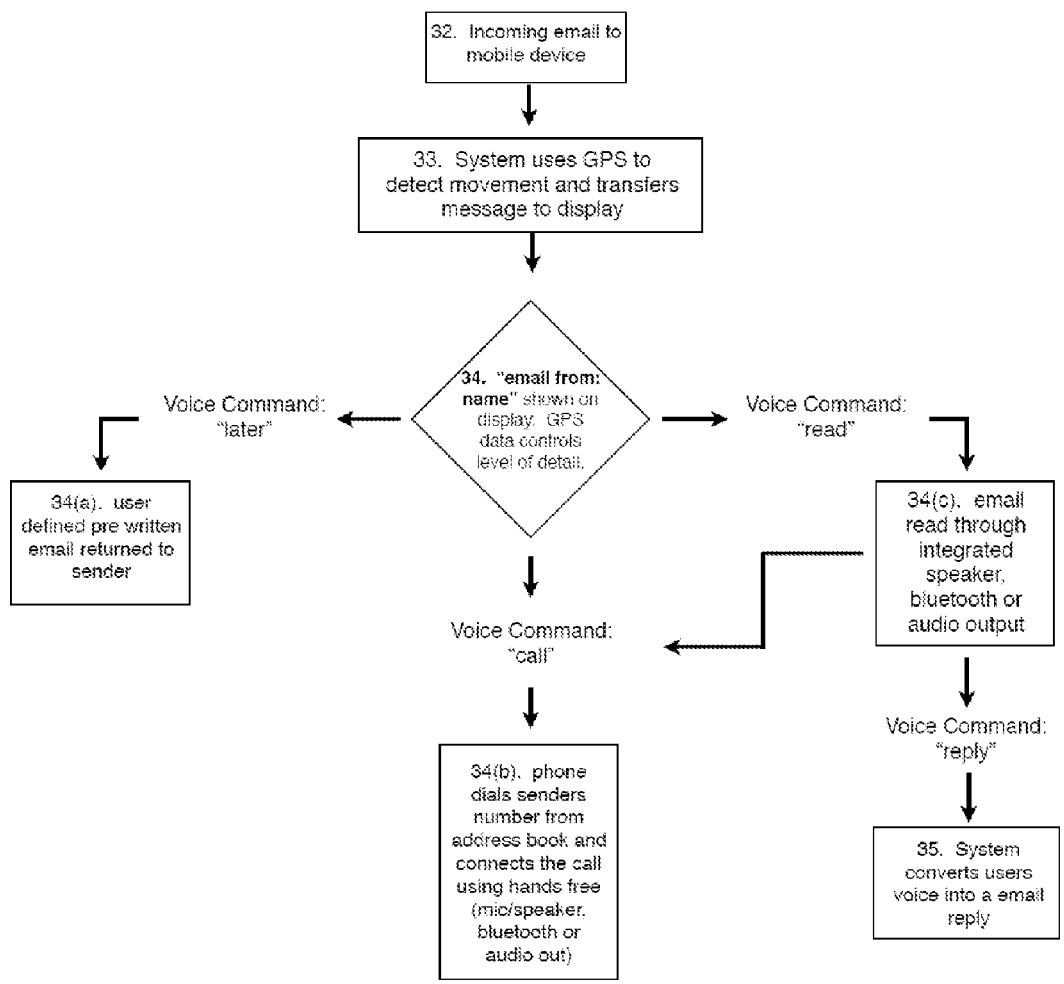
FIG. 10 depicts a process flow diagram of processing an incoming e-mail message.

FIG. 10 depicts a process flow diagram of an incoming e-mail message (32). If movement of the mobile device is detected, information regarding the incoming message is transferred to the display (33). Information such as the sender name is transmitted to the display. In one embodiment the system is configured to include information from the subject matter line of an incoming e-mail message on the display. If a user issues a "later" command, a pre-defined e-mail message is returned to the incoming message sender (34a). If a user issues a "call" command, the mobile device dials a number corresponding to the sender of the incoming e-mail message and the call is handled via a hands-free system (34c). If a user issues a "read" command, the incoming e-mail message is converted to audio and played aloud for the user to hear via speakers or other audio output device. After listening to a message, a user can issue a "reply" command to dictate a reply message. After the user approves the reply message, the message is converted to text and sent to the message sender via e-mail.

Figure 11:
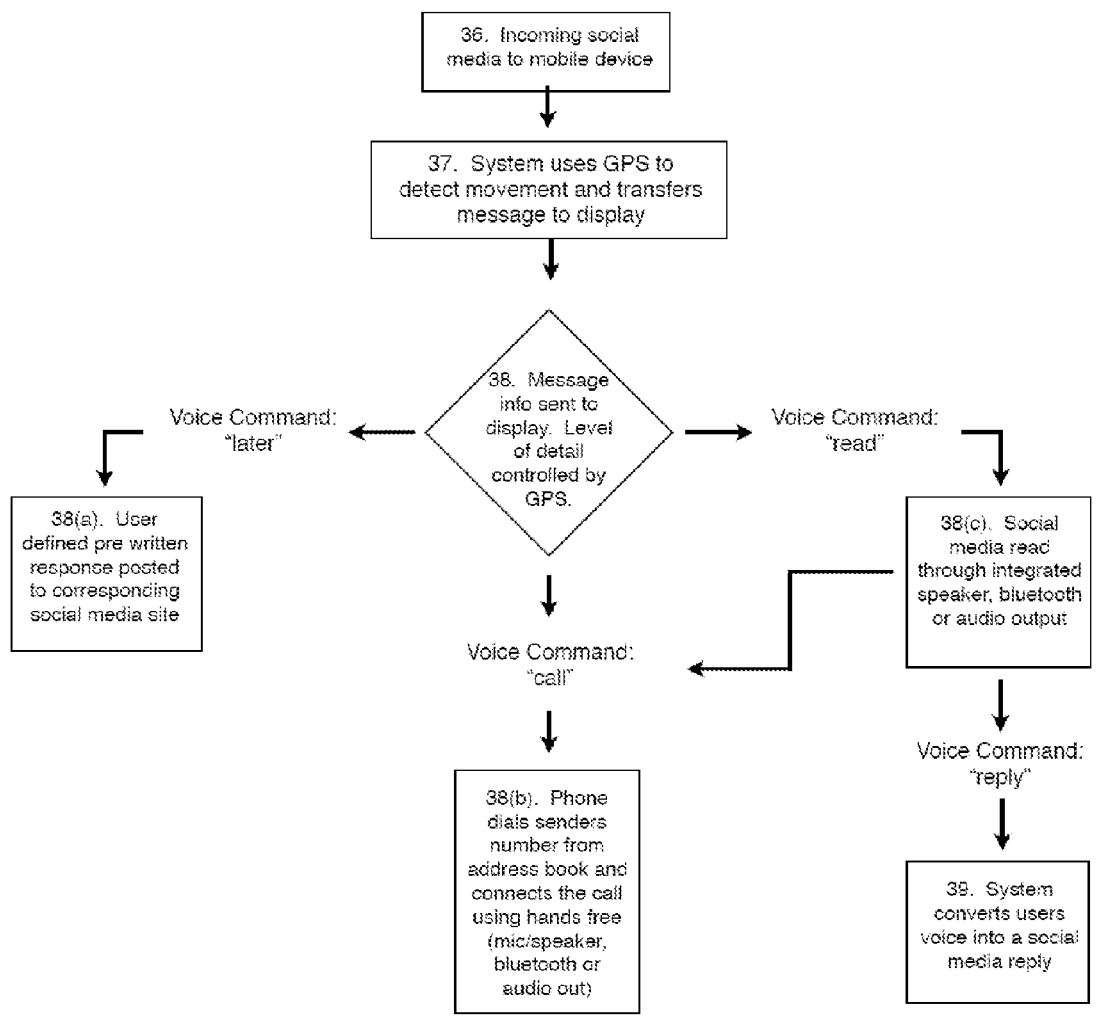
FIG. 11 depicts a process flow diagram of processing a social media message.

FIG. 11 depicts a process flow diagram of an incoming social media message (36). If movement of the mobile device is detected, information regarding the incoming social media message is transferred to the display (37). If a user issues a "later" command, a pre-defined written response is posted to a corresponding social media site (38a). If a user issues a "read" command, the social media message is read out loud through integrated speakers, car speakers or other audio output device (38b). If a user issues a "call" command, the system causes the number corresponding to the sender of the incoming message to be dialed for a hands-free phone call (38c).

For purposes of the preceding embodiments, an "ignore" command may also be accomplished by a user taking no action with respect to an incoming message. The "ignore" "read" "call" and other features identified herein can be configured to correspond to any words, phrases or signals.

The invention claimed is:

1. A method of handling incoming messages on a mobile device comprising:
   receiving an incoming message in the form of a phone call, text, voice mail or other communication from a sender;
   determining if the mobile device is in motion in excess of a predetermined velocity, and when the mobile device is determined to be in motion in excess of the predetermined velocity, carrying out the following steps:
      providing limited information regarding the incoming message on a display, the limited information being selected from one or more of the group consisting of information identifying the sender of the incoming message, an avatar for the sender; mode of communication for the incoming message, and a subject of the incoming message; and
      providing a user with options to manage the message; the options including the following:
         issuing a command, resulting in storing the incoming message for later review and replying to the sender with a predefined message;
         issuing a command, resulting in the call being answered through a hands-free system; or
         issuing a command resulting in the incoming message being read to the user.

2. The method of claim 1 wherein the user prepares a response to an incoming message by dictating the response.

3. The method of claim 2 wherein the user response is converted to a text for transmission.

4. The method of claim 1, wherein the predetermined information is removed from the display when the user does not select one of the options within a specified time period.

5. A message processing system comprising:
   a display;
   a mobile communication device;
   a control module wherein the control module is configured to process messages incoming from a sender to the mobile communication device and display information regarding an incoming message on the display and wherein the control module is configured with pre-selected actions in response to the incoming message, wherein, when the incoming message is detected, the control module determines if the mobile communication device is in motion in excess of a predetermined velocity; when the mobile communication device is determined to be in motion in excess of the predetermined velocity, the control module limits the information displayed to information selected from one or more of the group consisting of information identifying the sender of the incoming message, an avatar for the sender; mode of communication for the incoming message, and a subject of the incoming message; and wherein, when the mobile communication device is determined to be in motion in excess of the predetermined velocity, the control module provides a user with options for responding to the incoming message, the options including:
      issuing a command, resulting in the control module storing the incoming message for later review and replying to the sender with a predefined message;
      issuing a command, resulting in the control module routing the incoming message to a hands-free phone system when the message is a call or dialing a phone number for the sender on the hands free phone system when the incoming message is a text communication or a voice mail; or
      issuing a command resulting the control module reading the incoming message to the user.

6. The system of claim 5 wherein the control module is a hardware unit separate from the mobile device.

7. The system of claim 5 wherein the control module is a software application operating on the mobile device.

8. The message processing system of claim 5, wherein the control module removes the displayed information from the display when the user does not select one of the options within a specified time period.

9. The message processing system of claim 5, wherein said control module has preselected numbers and limits the sending or receipt of any communications except to the preselected numbers when the mobile communication device is determined to be in motion in excess of the predetermined velocity.

10. The message processing system of claim 5, wherein the display is selected from the group consisting of a heads-up display and an in-dash display, and wherein said control module prevents full text being displayed from text communications when the mobile communication device is determined to be in motion in excess of the predetermined velocity.

11. A message processing system comprising:
   a display, wherein the display is selected from the group consisting of a heads-up display and an in-dash display;
   a mobile communication device;
      an application control module installed on the mobile device wherein the application is configured to process a message incoming from a sender to the mobile communication device and display information regarding the incoming message on the display and wherein the control module is configured with pre-selected actions in response to the incoming message, wherein, when the incoming message is detected, the control module determines if the mobile communication device is in motion in excess of a predetermined velocity; when the mobile communication device is determined to be in motion in excess of the predetermined velocity, said control module prevents full text being displayed from text communications and limits the information displayed to information selected from one or more of the group consisting of information identifying the sender of the incoming message, an avatar for the sender; mode of communication for the incoming message, and a subject of the incoming message; and wherein, when the mobile communication device is determined to be in motion in excess of the predetermined velocity, the control module provides a user with options for responding to the incoming message, the options including:

issuing a command, resulting in the control module storing the incoming message for later review and replying to the sender with a predefined message;

issuing a command, resulting in the control module routing the incoming message to a hands-free phone system when the message is a call or dialing a phone number for the sender on the hands free phone system when the incoming message is a text communication or a voice mail; or issuing a command resulting in the control module reading the incoming message to the user.

12. The message processing system of claim 11, wherein the control module removes the displayed information from the display when the user does not select one of the options within a specified time period.

13. The message processing system of claim 11, wherein said control module has preselected numbers and limits the sending or receipt of any communications except to the preselected numbers when the mobile communication device is determined to be in motion in excess of the predetermined velocity.

\* \* \* \* \*